July 30, 1929.  C. A. VAN DUSEN  1,722,346

FLEXIBLE HANDHOLE COVER

Filed April 30, 1926

INVENTOR
Charles A. Van Dusen,
BY
ATTORNEY.

Patented July 30, 1929.

1,722,346

UNITED STATES PATENT OFFICE.

CHARLES A. VAN DUSEN, OF CLEVELAND, OHIO, ASSIGNOR TO THE GLENN L. MARTIN COMPANY, OF CLEVELAND, OHIO, A CORPORATION OF OHIO.

FLEXIBLE HANDHOLE COVER.

Application filed April 30, 1926. Serial No. 105,709.

My invention relates to improvements in flexible handhole cover and closure members, and has for its object the provision of simple and positive means for sealing handhole openings of seaplane floats, marine hulls and the like; such means to combine the advantages of being strictly watertight, of being readily replaceable or removable, while retaining its sealing relation against partial submersion and wave action.

Metallic handhole covers heretofore used require considerable time for attachment and detachment, by reason of their securing means. Their added weight, as compared with the instant flexible rubber structure, is an objection. Metallic closures require separate means for maintaining the sealing relation necessary in structures of this class, which added parts still further augment the objectionable weight.

Figure 1:
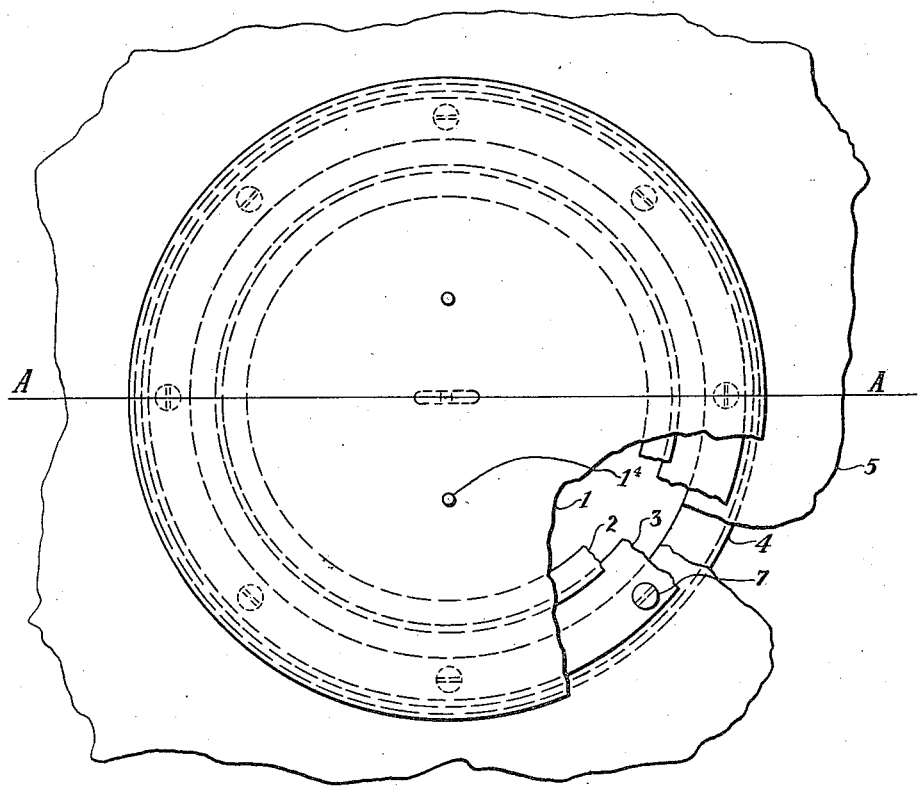
Figure 2:
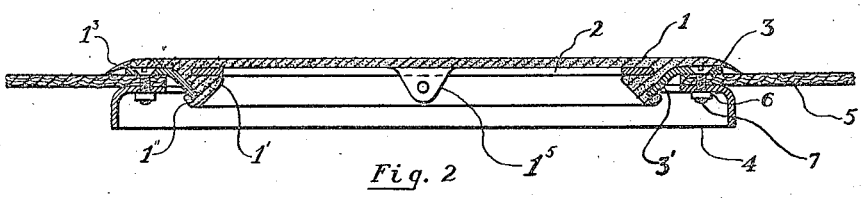

It will be appreciated that a soft rubber cover, even of the most careful design, will not sustain the rough usage that a closure of this character necessarily is subjected to, hence I have provided for the flexible soft rubber cover in accordance with my instant invention, suitable coacting means for accommodating and retaining it in place at the handhole opening under all working conditions. Thus the opening is provided with an annular inwardly flared flange, against which the cover bears as a seat and beneath which a retaining lip extends for holding it in place. Superposed above this flange, and of slightly greater exterior diameter than the circular opening thereof, there is provided a metallic ring or reinforcement affording sufficient flexibility for inserting and removing the cover, while serving securely to hold it in place when completely seated upon the annular flange of the handhole. Details of the preferred construction may best be explained in connection with the accompanying drawing, wherein:

Figure 1 is a plan view, partially broken away, illustrating one of the closure members of my invention installed in position upon a handhole of a seaplane float or other marine construction, and Fig. 2 is a transverse section thereof on line A—A, Fig. 1.

Throughout the figures of the drawing I have employed the same character of reference to indicate similar parts, as respectively shown therein.

The body 1 of the closure is formed of soft vulcanized rubber. It is provided with an annular metallic member 2 inserted in the cover structure, or it may be vulcanized therein, if desired. The handhole opening is provided with an annular retaining ring 3 having an inwardly flared flange 3', while a stiffening ring 4 is secured beneath the skin 5 of the float or other marine structure, by means of the nuts 6 and bolts 7 which extend through said retaining and stiffening rings 3 and 4.

Positioned as it is, with the exterior diameter of the ring 2 substantially in excess of the diameter of the flared flange 3', it will be seen that the coacting portion 1' of the soft rubber closure is held closely to its seat by means of the flexible lip 1".

Were the ring 2 omitted from this structure, the rubber cover very readily would collapse within the associated float or hull, but this is absolutely prevented by the ring, which also inhibits the accidental displacement of the cover when properly placed in position. Preferably a thin lip $1^3$ is provided for engaging the skin 5 peripherally of the retaining ring 3 and openings $1^4$ are provided to permit an equalization of the air pressure or a breather action. If desired, a suitable anchorage may be attached to the inwardly extending lug $1^5$ to prevent the loss or misplacement of the closure member when it is removed from the opening.

It will be appreciated that the circular reinforcing member associated with the soft rubber body of the closure element effectively prevents its collapse when subjected to external water pressure under conditions of use. Moreover, it aids in maintaining the sealing relation of the closure means.

Preferably said reinforcing member has slight flexibility. It may be readily replaced by another metal annulus if one becomes distorted or corroded. Such member also may take the form of a hard rubber part permanently vulcanized into the closure structure, if desired.

Soft vulcanized rubber of highest quality and resiliency is to be preferred in embodying my invention. Nevertheless, in specifying rubber in my specification and claims, I propose to and do include all suitable compositions exhibiting similar qualifications for the instant purposes. Furthermore, it is obvious that my closures may be adapted to openings other than round openings, and I desire to have it understood that where in the appended claims the term "circular" is employed, it should be construed to include other shapes such as oval and rectangular and that the term "annular" should be construed to apply to oval and polygonal frames as well as rings.

Having now set forth preferred means embodying my present invention, I claim as new and desire to secure by Letters Patent, together with such modifications as may be made by one ordinarily skilled in the art, the following:

1. In closure means of the class described, the combination with an annular flanged seat, of a coacting disclike rubber closure element having an annular sealing face and a retaining rim for engaging the rim of said seat, and a circular reinforcing member associated with said sealing face of such diameter as to prevent its accidental displacement from the seat, substantially as set forth.

2. In closure means of the class described, the combination with an annular closure seat, of a coacting disclike rubber closure element having an annular sealing face and a retaining rim adapted to engage the rim of said seat, and an annular reinforcing member substantially greater in diameter than the engaged rim of the seat provided within the rubber closure element, substantially as set forth.

3. In closure means of the class described, the combination with an annular handhole member having an inwardly flared rim, of a coacting disclike rubber closure element therefor having a retaining rim shaped to fit beneath the rim of said handhole member, and a flexible circular reinforcing member associated with the closure element adjacent to its depending rim, substantially as set forth.

4. In closure means of the class described, the combination with an annular metallic handhole member having an inwardly flared rim, of a coacting disclike rubber closure element therefor having an annular depending rim shaped to fit beneath said inwardly flared rim and an annular apron adapted to cover the handhole member when positioned for closure thereof, and a flexible circular reinforcing member positioned in said element above its annular depending rim, substantially as set forth.

5. In closure means of the class described, the combination with an annular metallic handhole member having an abruptly flared inner rim, of a coacting disclike rubber closure element therefor having a retaining rim adapted to fit about and beneath said flared rim, and a circular reinforcing member of greater diameter than the opening in the annular flared rim associated with the sealing face of said closure element and disposed above the retaining rim, substantially as set forth.

6. In closure means of the class described for a vessel having an opening provided near its periphery with a continuous projection, the combination of a disk-like flexible closure element formed of readily collapsible material, having a continuous lip adapted to releasably grip said projection when the closure is forced onto its seat, and means for preventing the collapse of said closure element inwardly comprising a circular reinforcing member mounted within the closure element and overlapping the inner edge of said continuous projection.

7. In closure means of the class described for a vessel having an opening provided with an inwardly extending annular projection, the combination of a disk-like flexible closure element formed of readily collapsible material, having a continuous lip adapted to resiliently and releasably grip said projection when the closure is forced onto its seat, and means for preventing the collapse of said closure element inwardly comprising an annular reinforcing member embedded within the closure element and overlapping the inner edge of said annular projection.

8. In closure means of the class described for a vessel having an opening provided near its periphery with a continuous projection, the combination of a disk-like flexible closure element formed of readily collapsible material, having a continuous lip adapted to releasably grip said projection when the closure is forced onto its seat, of a non-yielding, annular, reinforcing member associated with said closure element in proximity to said lip, whereby the collapse of the closure element is prevented.

9. In closure means of the class described, the combination with a disk-like rubber closure element, of an annular reinforcing member inseparable from and adjacent its closure face, said member being adapted to resist movement of the closure face inwardly toward the center of the closure element, substantially as set forth.

10. In closure means of the class described, the combination with a disk-like rubber closure element having an annular sealing face, of an annular reinforcing member inserted within said element and removable therewith, said member being adapted to resist movement of the sealing face inwardly toward the center of the closure, substantially as set forth.

11. In closure means of the class described for a vessel having an opening provided near its periphery with a continuous projection, the combination with a disk-like flexible closure element formed of readily collapsible material having a continuous lip adapted to releasably grip said projection when the closure is forced onto its seat, said closure element being provided with a breather opening, whereby the pressure conditions upon opposite sides of the closure element are maintained substantially equal.

In testimony whereof I do now affix my signature.

CHARLES A. VAN DUSEN.